United States Patent [19]

Chvojcsek

[11] 4,439,798
[45] Mar. 27, 1984

[54] REFERENCING DEVICE FOR DIGITAL DATA RECORDERS

[75] Inventor: Frank Chvojcsek, Chicago, Ill.

[73] Assignee: Stenograph Corporation, Skokie, Ill.

[21] Appl. No.: 302,117

[22] Filed: Sep. 14, 1981

[51] Int. Cl.³ .................. G11B 5/00; G11B 27/00; B41J 3/26

[52] U.S. Cl. .................................. 360/4; 178/21; 360/5; 400/91; 400/94

[58] Field of Search ............. 360/4, 5; 400/91, 94; 178/21

[56] References Cited

U.S. PATENT DOCUMENTS

| | | |
|---|---|---|
| 2,319,273 | 5/1943 | Sterling . |
| 3,557,927 | 1/1971 | Wright et al. . |
| 4,024,943 | 5/1977 | Steiner ........................... 400/91 X |
| 4,123,785 | 10/1978 | Cherry et al. ..................... 360/4 X |
| 4,176,973 | 12/1979 | Gregory et al. ................. 400/91 X |
| 4,205,351 | 5/1980 | Michals . |
| 4,363,557 | 12/1982 | Fowler et al. ..................... 400/91 |

*Primary Examiner*—Robert L. Richardson
*Attorney, Agent, or Firm*—Lee, Smith & Jager

[57] ABSTRACT

An improved referencing device for identifying for future reference a portion of a data record as it is being recorded for use in combination with a shorthand machine generating electrical output signals corresponding to the keys depressed, a recording medium, and recorder associated with said shorthand machine for making a data record of the signals generated thereby on said recording medium. The referencing device comprises means for generating a reference signal separate and independent from the output signal generated by said shorthand machine and for inputting said reference signal to said data recorder for making a record of the referencing signal on the recording medium. A portion of the data record may then be identified for future reference by the reference signal record.

15 Claims, 5 Drawing Figures

REFERENCING DEVICE FOR DIGITAL DATA RECORDERS

BACKGROUND OF THE INVENTION (1) Incorporation by Reference

The disclosure herein incorporates by reference commonly assigned U.S. Pat. Nos. 4,205,351, issued May 27, 1980, for "Digital Data Recorder"; and, 4,363,537, issued Dec. 14, 1982, for "Marking Device for a Shorthand Machine".

(2) Field of the Invention

The invention is related to a referencing device for the combination of a digital data recorder and shorthand machine and is particularly directed to means for inputting a signal to a recorder logic/control circuitry which signal is identifiable with a predetermined addres for encoding onto a recording medium for later decoding with a resultant reference record on the produced stenographic record. The invention is includable as an improvement in such a combination wherein there is further provided a paper tape marking device suited for accommodating the referencing device.

(3) Description of the Prior Art

Stenography is a widely used technique for recording the spoken word. The basic process includes two steps:

(1) Making a phonetic record of the speech being recorded, and (2) Transcribing the phonetic record to a grammatical record such as, by way of example, an English language transcript.

To ensure reliability and efficiency in the recording process, and to simplify the transcribing process, shorthand machines are frequently employed to produce the phonetic record. Such machines are especially useful where the recording is made over a relatively long period of time, for example, in the courtroom or at a business meeting.

Machine shorthand operators frequently desire to mark the paper tape output produced by the shorthand machine to denote a portion or portions of the notes recorded thereon for ready reference and quick retrieval of the information there encoded. In the past, this has been accomplished by merely marking the tape with a pen or pencil, or slightly tearing the paper at its margin to indicate specific portions of the notes. The aforementioned U.S. Pat. No. 4,363,577, assigned to the assignee of the present application is directed to a marking device for use in a machine shorthand and provides a very desirable solution to the problem of referencing the output tape where the operator deems it necessary, such as where reference to a particular portion of the notes is required during later transcription.

This marking device of the said U.S. Pat. No. 4,363,557 is one suitable means for accommodating the device of the present invention. It overcomes many previous attempts at paper tape marking and does not require removal of the operator's hands from the keyboard, which would otherwise cause interruption during the recording process causing the operator to fall behind contemporaneous recording.

In the aforementioned U.S. Pat. No. 4,205,351, assigned to the assignee of the present application, and also incorporated herein by reference for the purpose of disclosing the illustrated embodiment, a digital data recorder is provided whereby a machine shorthand device offers significant improvement over prior recorders and is designed for recording digital data on a magnetic tape medium at high speed, utilizing maximum space on the magnetic for data storage. At the same time, a paper tape output can be simultaneously encoded in a normal manner such as described in U.S. Pat. No. 2,319,273 entitled "Stenographic Machine", issued to J. G. Sterling and assigned to the assignee of the present application.

The digital data recorder of said referenced U.S. Pat. No. 4,205,351, obviates the need for the operator to read back the paper tape containing the phonetic characters to make a corresponding grammatical record. However, the paper tape output is yet available for reference and correspondence to the digital data stored on a magnetic tape medium.

By way of background, and consistent with the vernacular appropriate to shorthand machine technology, the following terms are used throughout this disclosure and are to be given their intended meaning as understood in this art:

The term "stroke" refers to the act of an operator engaging the keys of a shorthand machine with sufficient force to impress a similar character on the paper tape, and/or to produce an electrical output representing the symbol.

The terms "symbol" and/or "character" means any representation of numerals and word constructions including but not limited to letters of the alphabet.

The terms "combination" is intended to include single as well as multiple elements.

The term "phonetic words" means a particular combination of phonetic characters which may form all or part of the phonetics of the spoken word.

(4) Objects of the Invention

It is the primary goal of this invention to provide a referencing device for use in a data receder in combination with a shorthand machine.

It is a significant goal of the invention to utilize, and improve upon, the marking device incorporated by reference herein and as disclosed in said U.S. Pat. No. 4,363,557, in combination with a recorder and shorthand machine.

It is further an important object of the invention to provide a referencing device capable of producing an electrical data signal for input to a logic/control circuitry of a digital data recorder having capacity for acceptance of the referencing signal, such as disclosed in incorporated U.S. Pat. No. 4,205,351.

It is an allied goal of the invention to provide a referencing device producing an electrical output signal, separate and independent of signals generated by keyboard depressions generating from an associated shorthand machine, for conversion in a signal receiving recorder into a sequential binary bit having a bit address identifiable by a memory circuit where said reference signal is encoded and has an identifiable bit address, which when later decoded from the storage medium, allows the operator to produce referencing symbols or characters.

It is yet another goal of the invention to provide a minimal number of moving parts allowing the referencing device to be used quietly during operation.

It is a concomitant object of the invention to provide a referencing device, which may be included in a paper tape marking device for a shorthand machine in combination with a data recorder, and usable therein to achieve referencing of both the paper tape and magnetic storage medium during the same manipulation by the operator.

Consonant with the invention, it is an associated goal to provide a referencing device which inputs a reference signal to a recorder by means of the operator manipulating a manually movable means capable of mounting association adjacent a keyboard of a shorthand machine combined, and electrically communicating with the recorder.

SUMMARY OF THE INVENTION

The invention is directed toward means for generating a reference signal and means for receiving and selectively inputting said reference signal into a recorder in combination with a shorthand machine. The invention may be further capsulized by appreciating that the structure for a paper tape marking device may be utilized in cooperative association with the invention as an improvement thereover for identifying for future reference a portion of a machine shorthand record as it is being recorded on a recording medium by the recorder.

In further statement of the invention, a referencing device, for identifying for future reference a portion of a data record as it is being recorded, is provided wherein the device comprises means for generating a reference signal separate and independent from an output signal generated by a shorthand machine and for inputting the reference signal into a data recorder for making a record of the data signal on a recording medium. A portion of the data record may be identified for future reference by said reference signal record. The invention is useful in the combination of a shorthand machine for generating electrical output signals corresponding to keys depressed, a recording medium and a recorder associated with said shorthand machine for making a data record of the signals generated on the recording medium.

For utilization with a recorder for recording onto a recording medium signals constituting a machine shorthand record, the invention comprises a referencing device having means for generating a reference signal for identifying for future reference a portion of a machine shorthand record as it is being recorded on a recording medium by the recorder. In further summary, the recording device comprises means for generating a reference signal, and means for receiving and selectively inputting said reference signal into said recorder for recording onto the recording medium separate from the signals constituting the machine shorthand record. The recorded reference signal will thereby be usable to identify in the recording means a portion of the machine shorthand record.

DESCRIPTION OF THE ILLUSTRATED EMBODIMENTS

Specific reference to portions of the referenced U.S. Pat. Nos. 4,205,351 and 4,363,557 will be made with respect to their figures and descriptions as will become clear. The instant invention involves a referencing system which may be employed alone or combined with a paper marking device, such as disclosed in U.S. Pat. No. 4,363,557, as an improving modification, whereby paper marking ability is maintained. The referencing system is useful for inclusion in the combination of a shorthand machine and digital data recorder as described in U.S. Pat. No. 4,205,351. Accordingly, for purposes of describing a preferable embodiment, the descriptions of these reference teachings are to be given the same interpretation as they were intended. Numerical references in this disclosure include re-numbering of only those elements of the referenced teachings necessary to establish the structural relationship of the illustrated embodiment of the invention with the combination.

Figure 1:
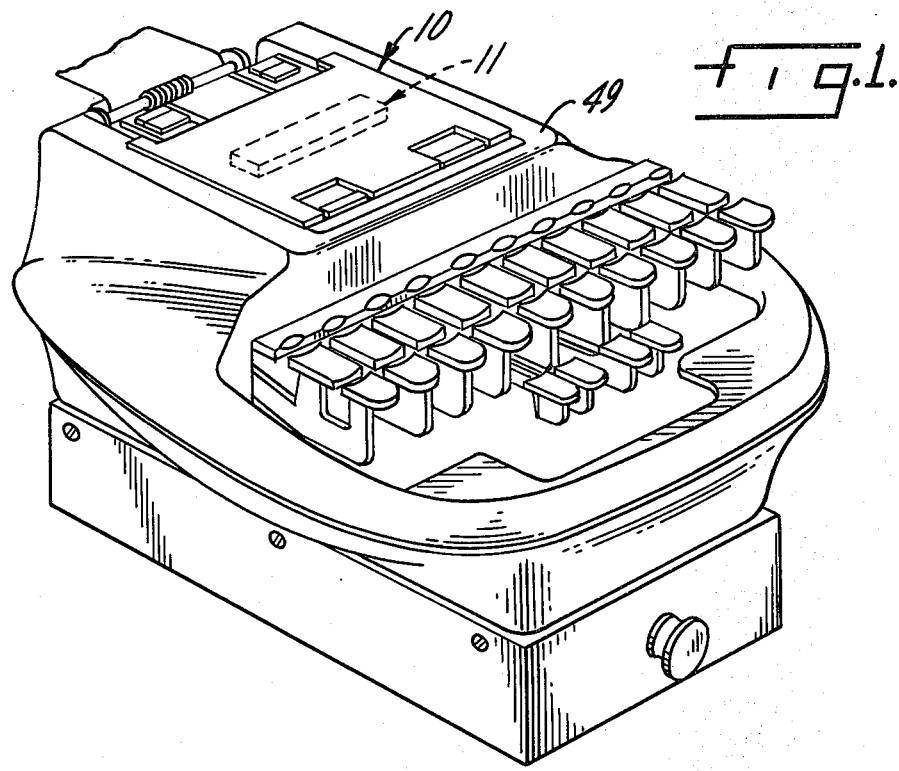
FIG. 1 is a perspective view of a shorthand machine in combination with a digital data recorder and having the preferred embodiment of the improved referencing device of the invention.
Figure 2:
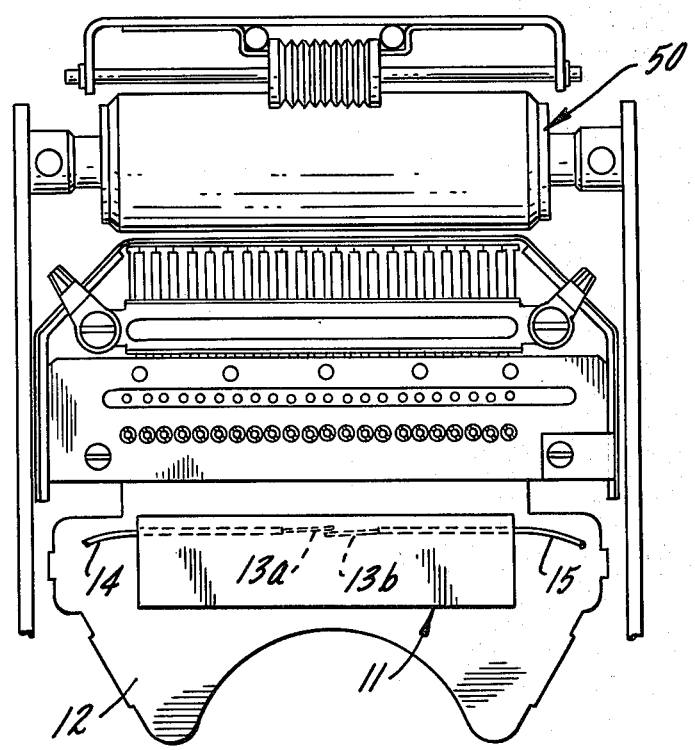
FIG. 2 is a fragmentary top view of the shorthand machine showing activating means in accordance with the invention mounted therein.

With reference to FIG. 1, a substantially identical duplication of FIG. 2 of U.S. Pat. No. 4,205,351 is shown having included therein referencing device 10 in the illustrated embodiment of the invention. Device 10 is suited for use in the digital recorder in combination with the shorthand machine by replacement of the removable access cover plate (not shown). Referencing device 10 comprises activating means preferably being switch 11 positioned as shown by the phantom lines. To the operator, the manual operation of referencing device 10 is the same as that for marking device 2 of U.S. Pat. No. 4,363,557.

Figure 3:
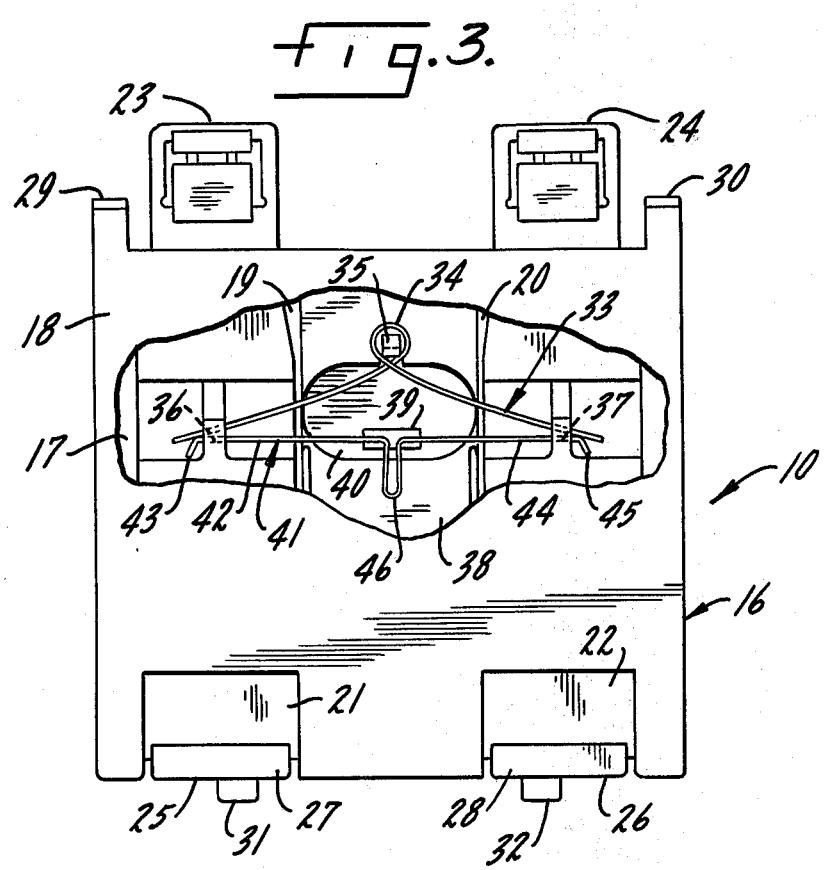
FIG. 3 is a top elevational view, partially broken away, of the improved referencing device as shown in FIG. 1.

FIG. 2 is substantially a duplication of FIG. 9 of U.S. Pat. No. 4,205,351, wherein an additional portion of the shorthand machine is shown at guard plate 12. Guard plate 12 provides a mounting portion for switch 11. As shown in FIG. 3 of U.S. Pat. No. 4,205,351, the guard plate structure is shown generally at numerical reference 32 having a flat planar surface facing upwardly removable cover plate 35. Switch 11 preferably comprises a reed switch having contacts 13a, 13b. Contacts 13a, 13b, are magnetically influenced at passage of a magnetic field thereover where opening and closing may be achieved. Means for inputting a reference signal includes leads 14 and 15 for electrical continuity with a logic and control circuitry such as described in U.S. Pat. No. 4,205,351. Means for receiving and selectively inputting a reference signal is provided wherein lead 14 connects to the frame of the shorthand machine and lead 15 connects to the parallel/serial convertor described in U.S. Pat. No. 4,205,351. Actuation of switch 11 to the contact closure position produces an input signal to the parallel/serial convertor, while at the same time a paper tape may be marked in accordance with the teachings of U.S. Pat. No. 4,363,557.

Turning now to FIG. 3, inclusion of the illustrated embodiment with the marking device of said referenced U.S. Pat. No. 4,363,557 is shown. Certain elements of this reference patent have been re-numbered to illustrate the relationship with the invention.

In the illustrated embodiment referencing device 10 forms an improvement for the combination of a recorder and shorthand machine having said tape marking device, wherein a housing 16 has a first plate 17 secured with a second plate 18. First plate 17 includes substantially parallel longitudinal channels 19 and 20 respectively accommodating manually movable means comprising elongate keys 21 and 22 which are capable of sliding motion. Elongate key 21 has a forward end 23 and rearward end 25. Elongate key 22 has a forward end 24 and rearward end 26. The rearward ends 25 and 26 are adjacent the keyboard and face the operator during use. Finger pads 27 and 28 provide easy manipulable contact surfaces during recording procedures. Means for removably mounting housing 16 is provided at tabs 29, 30, 31 and 32 in similar fashion to the tabs described in U.S. Pat. No. 4,363,557, best viewed in FIGS. 2, 3 and 5 thereof.

Biasing means 33 comprises the torsion spring structure of U.S. Pat. No. 4,363,557, which resiliently urges the manually movable means, elongate keys 21 and 22, to retracted positions. At elongate key 21, slot 36 accommodates a spring arm of biasing means 33. Similarly, slot 37 of elongate key 22 engages biasing means 33 at an opposite spring arm. Biasing means 33 includes coil 34 which engages around post 35 in the same fashion as described in the incorporated teachings of U.S. Pat. No. 4,363,557. Forming interior sides of longitudinal channels 19 and 20 is raised median strip 38 which includes post 35 at a generally central location relative to longitudinal channels. Disposed adjacent post 35, and toward the key rearward ends, referencing device 10 includes magnet 39 residing in movable relationship within magnet well 40. Magnet well 40 is a recess formed within raised median strip 38. Resilient retention means engage magnet 39 and preferably comprises wire clip 41 having oppositely extending arms 42 and 44. At slot 36 arm 43 terminates in bent end 43 and correspondingly at slot 37 arm 44 terminates in bent end 45. Bent ends 43 and 45 form lateral stops preventing unwanted lateral displacement of magnet 39 during use. Vertical position maintenance is achieved by the provision of magnet stabilizer loop 46 forming a central loop integral with arms 42 and 44 of wire clip 41. Stabilizer loop 46 is sandwiched between, in sliding contact with, raised median strip 38 at one side and second plate 18 at the other. This arrangement facilitates positional maintenance of magnet 39 during sliding movement upon activation of the keys.

Magnet well 40 is provided in a sufficient longitudinal dimension for free magnet movement, whereby at the advanced position magnet 39 will stop before contact with post 35, and at the retracted position stop short of an opposite well edge. Raised median strip 38 is raised slightly above longitudinal channels 19 and 20 thereby allowing magnet well 40 to be formed in a hollowed-out manner having a bottom surface substantially co-planar with the bottom of longitudinal channels 19 and 20. Magnet 39 slides to the retracted and advanced positions in a substantially coplanar manner with elongate keys 21 and 22. The structure disclosed in U.S. Pat. No. 4,363,557 affords such modification for inclusion of referencing device 10, as would be clear.

Figure 4:
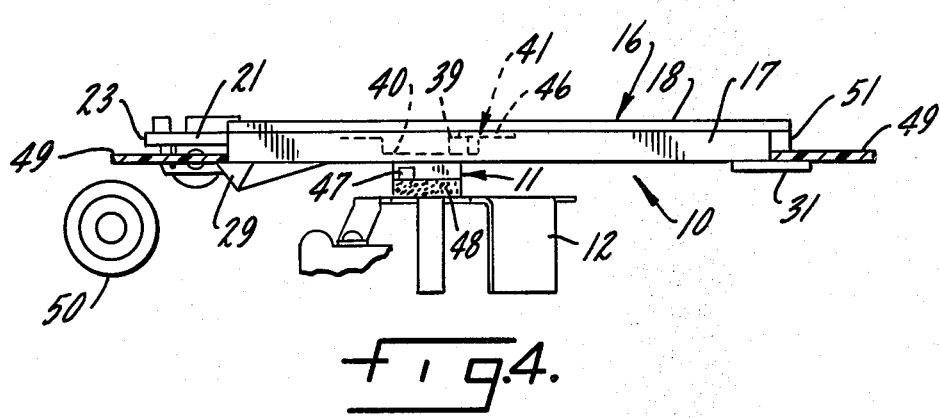
FIG. 4 is a diagrammatic illustration of a side view of the referencing device illustrated in FIG. 3.

Turning now to FIG. 4, a side view of referencing device 10 is shown looking generally from the left side of FIG. 3. Accordingly, elongate key 21 is shown slidably positioned between first plate 17 and second plate 18 of housing 16. The removable mounting means comprising tabs 29 and 31 are shown engaged with portions of the shorthand machine at machine housing 49. This mounting means is the same as shown in said U.S. Pat. No. 4,363,557 when viewing FIG. 4 thereof. In hidden lines, magnet 39 is shown disposed within magnet well 40 and having stabilizer loop 46 in movable contact between first plate 17 and second plate 18 for said vertical position maintenance.

Guard plate 12 is shown facilitating the mounting of switch 11 thereon. Guard plate 12 is a conventional structure in shorthand machine construction, which additionally may facilitate ribbon guidance as well as protectively covering the moving mechanism below. The invention utilizes the structure of guard plate 12 in that mounting means for switch 11 can be located thereon. The mounting means preferably comprises a plastic foam pad 48 having a double-sided adhesive feature for quick and sure mounting atop guard plate 12. This provision allows for the adaptation of a digital data recorder, as disclosed in said referenced U.S. Pat. No. 4,205,351, for use with referencing device 10.

Switch 11 is preferably a reed-type switch and is shown adhesively secured to foam pad 48 in adjacent position below magnet well 40. In this location, contacts 13a and 13b will be magnetically influenced upon movement of magnet 39 in response to the manually movable keys. Closure of contacts results from movement to the advanced, or second, position from the retracted, or first, position of the keys and magnet. Opening, as would be apparent, occurs with key and magnet movement back to the first position. The magnet influencing movement and switch comprises the activating means of the invention.

Switch 11 includes opening 47 for lead wire 14 and, simlarly, at the other side a similar opening (not shown) would be provided for lead 15.

Elongate key 21 may include a paper marking instrument as described in U.S. Pat. No. 4,363,557, but with the provisions of the invention, a paper marking instrument need not be utilized for referencing. Accordingly platen assembly 50 may or may not be provided with a paper tape. Thus, the invention, while advantageously can utilize the structure as illustrated, is not intended to be limited to the identical structure. The illustrated embodiment is disclosed for purposes of explanation of the best mode known to practice the invention. It is desirable, however, that both paper tape referencing and magnetic medium referencing be provided for cross-reference purposes and other needs of the operator for transcription procedures.

A pressure locking pad 51, substantially identical to the element described in U.S. Pat. No. 4,363,557, may be provided for resilient stationing of reference device 10 with respect to machine housing 49.

It is therefore clear that there has been provided means for generating an electric input signal, which is an improvement to the marking device as described in said U.S. Pat. No. 4,363,557. Activating means responsive to manually movable means preferably includes a magnetically influenced reed switch to complete electric continuity with a recorder circuitry by movement of a key to an advanced, or input, position which closes switch contacts. As such, means for generating and selectively inputting a signal is provided. The preferred embodiment of the reed switch comprises conventional construction known as a micro reed switch. The switch is hermetically sealed for protection and the contacts are influenced by permanent magnets. Accordingly, magnet 39 is disclosed as being a permanent magnet having a size of about $\frac{1}{4}$″ long, $\frac{1}{8}$″ high and $\frac{1}{8}$″ wide.

The improved referencing device of this invention is fully adaptable for association with logic and control circuitry, such as disclosed in said U.S. Pat. No.

Figure 5:
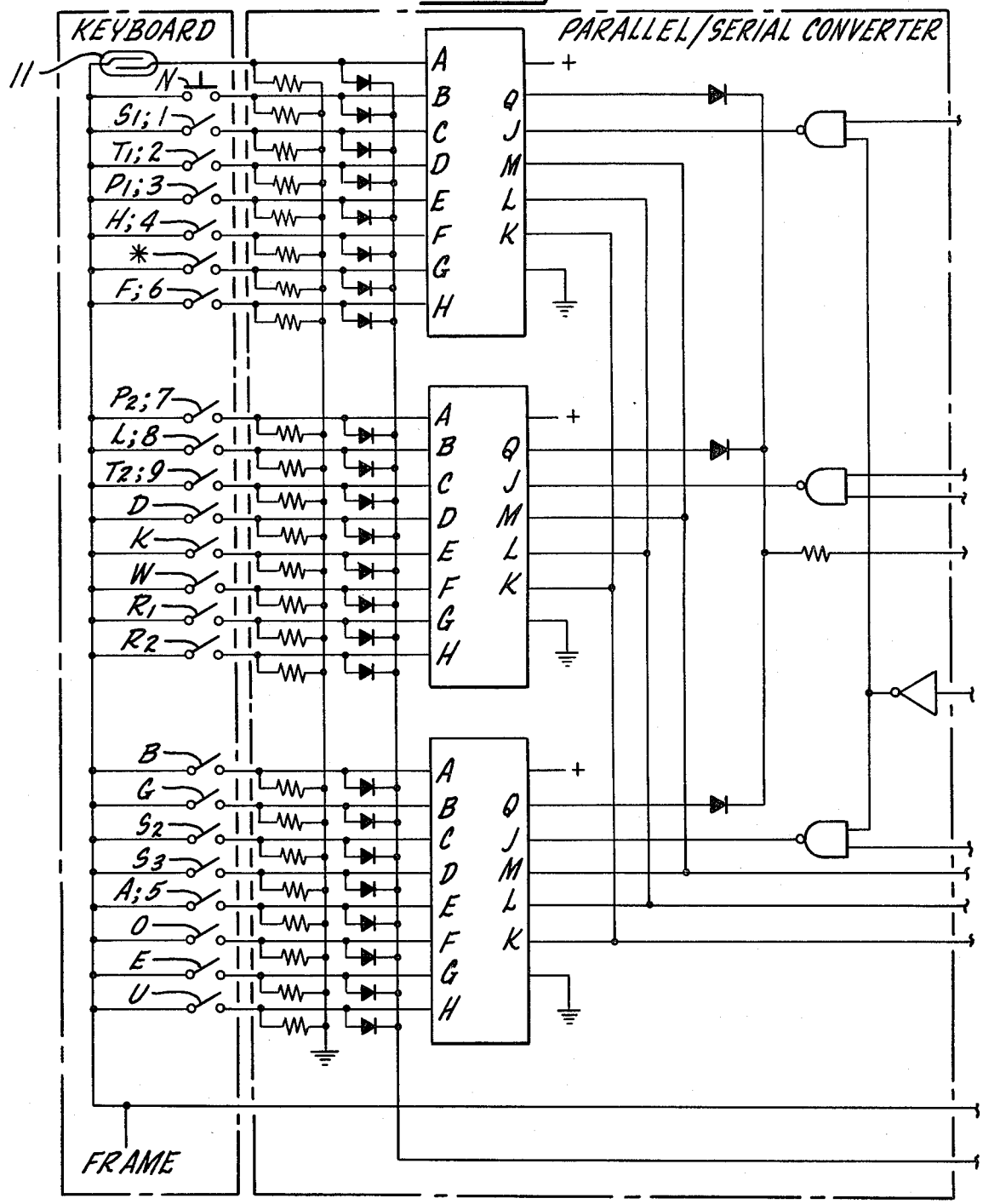
FIG. 5 is a circuit diagram substantially as shown in FIG. 12 of U.S. Pat. No. 4,205,351, generally illustrating the electrical communication of the embodiment of the invention shown in the Figures.

4,205,351. At columns 10–12 of said patent, the increased capacity of the logic and control circuitry is discussed, which permits acceptance of additional input information. FIG. 5 substantially duplicates FIG. 12 of said patent. Opportunely, connecting switch 11 with terminal A and the frame takes advantage of this output capability. The reference signal generated upon closure of contacts 13a and 13b produces a keyboard-independent and separate signal defining one bit apart from a keyboard "stroke". Adaptation of the parallel/serial convertor of said patent would be well understood by one skilled in the art. The bit address of the output signal from switch 11 would have stored or "written" a dedicated bit address in the memory. At column 12 of said referenced patent, the "ignored counts" are therefore utilized for additional input information. In this manner, identification by the operator may be provided at necessary portions during recording for later reference. Such may be useful where there are interruptions in conversations, additional insert information, or for other uses. The data bit would have the corresponding bit address in the memory circuitry whereby later conversion, or decoding, would yield the necessary corresponding print-out format as stored.

Referencing device 10 improves upon the structure shown in U.S. Pat. No. 4,363,557 and conveniently takes advantage of the capability of the logic/control circuitry of U.S. Pat. No. 4,205,851 in achieving an improved referencing device well suited to shorthand transcribing procedures.

As will be understood, the invention can be practiced without a paper tape marking device and its application as an improvement to the marker structure of U.S. Pat. No. 4,363,557 is but the preferred mode. Also, it is to be understood that various recorder and circuit designs are capable of receiving a referencing signal for storage on a recording medium. The illustrated example herein is not to be viewed as limited to the logic/control circuit disclosed in the U.S. Pat. No. 4,205,351.

As explained, a paper marking function is desirably included to benefit the operator. However, with digital data recorders, a magnetic tape storage alone may be used. Equivalent structures will become apparent to those skilled in the shorthand machine and data recorder arts.

While elongate keys are preferably provided, the invention is not to be construed as being limited to manually movable means employing keys. It would be clear that a wide variety of movable means could be employed.

With the increased capacity intended by the disclosure of U.S. Pat. No. 4,205,351, noted at columns 10–12, more than a single additional output signal could be accommodated by the logic/control circuitry. It would therefore be understood that a plurality of magnets, each responsive to a manually movable means, could be utilized in cooperation with separate switching means for generation of separate output signals. Each signal could represent a data bit with a different bit address assigned to each. Such modification and adaptation of the referencing device disclosed herein is considered as but one alternate embodiment well within the scope of the teaching.

While certain features and embodiments of the invention have been described in detail, it should be understood that alternatives and equivalents may be employed without departing from the scope and spirit of the invention as defined and claimed in the appended claims.

What is claimed is:

1. In combination with a shorthand machine for generating electrical output signals corresponding to the keys depressed, and a recorder associated with said shorthand machine for making a data record of the signals generated thereby on a recording medium; an improved referencing means for identifying for future reference a portion of a data record as it is being recorded, said improvement comprising:

manually operable means and activating means, said activating means being electrically and mechanically separate from said manually operable means, said manually operable means being capable of selectively activating said activating means to generate a reference signal separate and independent from the output signal generated by said shorthand machine and for inputting said reference signal into said data recorder for making a record of said reference signal on said recording medium, whereby a portion of the data record may be identified for future reference by said reference signal.

2. A device as in claim 1 wherein said manually operable means includes movable means manually movable from a non-activating position to an activating position.

3. A device as in claim 2 wherein said activating means for generating a reference signal comprises switch means actuated in response to said movable means to produce an input signal to said recorder upon movement of said movable means from said non-activating to activating position.

4. A device as in claim 3 wherein said switch means electrically communicates with said record and is capable of completing electrical connection with said recorder and inputting said reference signal.

5. A device as in claim 4 wherein said switch means includes magnetically responsive contacts capable of closing upon sensing magnetic flux.

6. A device as in claim 5 wherein said manually operable means includes a permanent magnet and means for mechanically linking said magnet in movable response to said movable means, said magnet being movable into and out of magnetically influencing proximity to the contacts of said switch means.

7. A device as in claim 2 wherein said manually operable means includes means for resiliently biasing said movable means in said non-activating position.

8. A device as in claim 1 wherein said manually operable means includes mounting means in removable association with said shorthand machine, whereby said manually operable means is capable of being fully removed therefrom.

9. For use with a recorder for recording onto a recording medium signals constituting a machine shorthand record, referencing means for identifying for future reference a portion of a machine shorthand record as it is being recorded on a recording medium by the recorder, said referencing means comprising: a first device having means for selectively establishing magnetic flux at a pre-determined location, and a second device having means for sensing said magnetic flux and for generating a reference signal and inputting said reference signal into said recorder for recording onto the recording medium separate from from the signals constituting the machine shorthand record, whereby the recorded reference signal will identify on the recording medium a portion of the machine shorthand record.

10. A referencing system for use with a recorder in combination with a shorthand machine having a keyboard comprising a set of keys wherein numerals, words or parts of words correspond to keys and combinations of keys, the recorder of the type for recording a data signal on a storage medium in encoded form, the referencing system comprising:
- a selectively operable referencing device having hand-movable means disposable adjacent said keyboard, said hand-movable means being biased in a first position and being movable to a second position at the discretion of the user;
- activating means capable of sensing the movement of the movable means of the referencing device to said second position, said activating means including means for generating an input signal to the recorder responsive to sensing the second position of the movable means;
- said referencing device and activating means being separately stationed in said system without electrical or mechanical connection therebetween;

whereby said referencing system is capable of being selectively activated by the operator to thereby produce input signals receivable by said recorder for encoding and storage on said storage medium.

11. A referencing system as in claim 10 wherein said activating means comprises a switch capable of electrical communication with the recorder.

12. A referencing system as in claim 11 wherein said switch has contacts capable of closing and opening in response to movement of said movable means to the second position and back to said first position, respectively.

13. A referencing system as in claim 12 wherein said switch comprises a reed switch wherein said contacts close in response to the presence of the magnetic field of a permanent magnet.

14. A referencing system as in claim 13 wherein said referencing device includes a housing movably supporting said hand-movable means, a magnet, and means linking the movable means with the magnet, whereby said magnet is movable from a first to second position responsive to movement of said hand-movable means, wherein upon movement of the hand-movable means to the second position said magnet is positioned to magnetically influence said switch contacts to close.

15. A referencing system as in claim 10 wherein said referencing device includes mounting means removably engageable with a shorthand machine whereby said referencing device is fully removable therefrom independently of said activating means.

* * * * *

UNITED STATES PATENT AND TRADEMARK OFFICE
CERTIFICATE OF CORRECTION

PATENT NO. : 4,439,798
DATED : March 27, 1984
INVENTOR(S) : Frank Chvojcsek

It is certified that error appears in the above-identified patent and that said Letters Patent are hereby corrected as shown below:

Claim 9, Column 8, Line 66, delete "from from" and substitute therefor
   --from--.

Column 1, Line 17, delete "addres" and substitute therefor
   --address--.

Column 2, Line 36, delete "recoder" and substitute therefor
   --recorder--.

Column 4, Line 62, delete "reference" and substitute therefor
   --referenced--.

Column 5, Line 32, delete "comprises and substitute therefor
   --comprise--.

Column 5, Line 33, delete "43" (first occurrence) and substitute
   therefor   --42--.

Signed and Sealed this

Twenty-first Day of August 1984

[SEAL]

Attest:

GERALD J. MOSSINGHOFF

Attesting Officer

Commissioner of Patents and Trademarks